United States Patent [19]

Ito et al.

[11] Patent Number: 5,335,565

[45] Date of Patent: Aug. 9, 1994

[54] ELECTRONIC CONTROL TYPE AUTOMATIC SPEED CHANGER

[75] Inventors: Yasunobu Ito, Okazaki; Makoto Hatasa, Anjo, both of Japan

[73] Assignee: Aisin AW Co., Ltd., Japan

[21] Appl. No.: 633,618

[22] Filed: Dec. 28, 1990

[30] Foreign Application Priority Data

Dec. 28, 1989 [JP] Japan .................................. 1-338194

[51] Int. Cl.[5] ............................................. F16H 59/24
[52] U.S. Cl. ................................ 477/131; 251/129.08
[58] Field of Search ........................ 74/866, 867, 856; 251/129.08; 364/426.01, 426.04, 424.1

[56] References Cited

U.S. PATENT DOCUMENTS

| | | | |
|---|---|---|---|
| 3,307,824 | 3/1967 | Weisheit | 251/129.08 X |
| 3,517,680 | 6/1970 | Richardson et al. | 251/129.08 X |
| 3,938,409 | 2/1976 | Uozumi | 74/856 X |
| 4,017,056 | 4/1977 | Schwalenstocker et al. | 251/129.08 |
| 4,355,296 | 10/1982 | Drone | 74/856 X |
| 4,373,697 | 2/1983 | Phelps | 251/129.08 X |
| 4,466,521 | 8/1984 | Hattori et al. | 74/866 X |
| 4,546,437 | 10/1985 | Bleckmann et al. | 364/426.01 |
| 4,638,689 | 1/1987 | Sakai | 74/867 X |
| 4,875,448 | 10/1989 | Dykstra | 364/424.01 X |

FOREIGN PATENT DOCUMENTS

58-65383 4/1983 Japan .................. 251/129.08

Primary Examiner—Dirk Wright

[57] ABSTRACT

In an electronic control type automatic speed changer equipped with a linear solenoid for controlling the oil pressure of the automatic speed changer, when potential difference is generated between the power ground (PE) and the signal ground (SE), the line pressure of the automatic speed changer does not coincide with the predetermined set value due to erroneous signals generated. In order to compensate for the potential difference between PE and SE, according to the present invention, a PE — SE potential difference compensator is provided in series between a current monitor device and PE, and a solenoid monitor circuit is provided for monitoring the potential of the connection point of the current monitor device and the PE—SE potential difference compensator. Thus even if there is a potential difference between PE and SE, a potential difference proportional to the current actually flowing in the linear solenoid can be detected. Thus, the current set for the solenoid current can be accurately made to coincide with the actual solenoid current, and the accuracy of control of the oil pressure of the automatic speed changer can be enhanced.

11 Claims, 7 Drawing Sheets

ELECTRONIC CONTROL TYPE AUTOMATIC SPEED CHANGER

BACKGROUND OF THE INVENTION

1. Field of the Invention

The present invention relates to an electronic control circuit for an automatic speed changer, and particularly relates to the current control of the linear solenoid for controlling the oil pressure in the oil pressure circuit thereof.

2. Prior Art

In recent years, in an electronic control type automatic speed changer (in the following, referred to as A/T), in controlling the oil pressure supplied to the clutch and brake, which are the speed changing mechanisms, it is known to use an electronic control device which employs an actuator such as a linear solenoid or a duty solenoid. Since the driving signals of the linear solenoid or duty solenoid were PWM signals, and the current flow was also comparatively large, the signals were subject to noise which resulted in errors in the performance of the electronic control device itself and in the signals to the electronic control device.

Therefore, as a countermeasure, the electronic circuit for the automatic speed changer (A/T) is designed so that, in correspondence to needs, the ground signals of the electronic control device are divided into a ground for the current flow of the linear solenoid, referred to as PE (power ground) below, and a ground for the current flow of the microcomputer in the electronic control device and interface circuit, referred to as SE (signal ground) below.

An example of the technology described above is shown in FIG. 5 which is a block diagram of the current control system of the linear solenoid of a conventional electronic control type speed changer. FIG. 6 is a partial circuit diagram of the current control system of FIG. 5.

Figure 5:
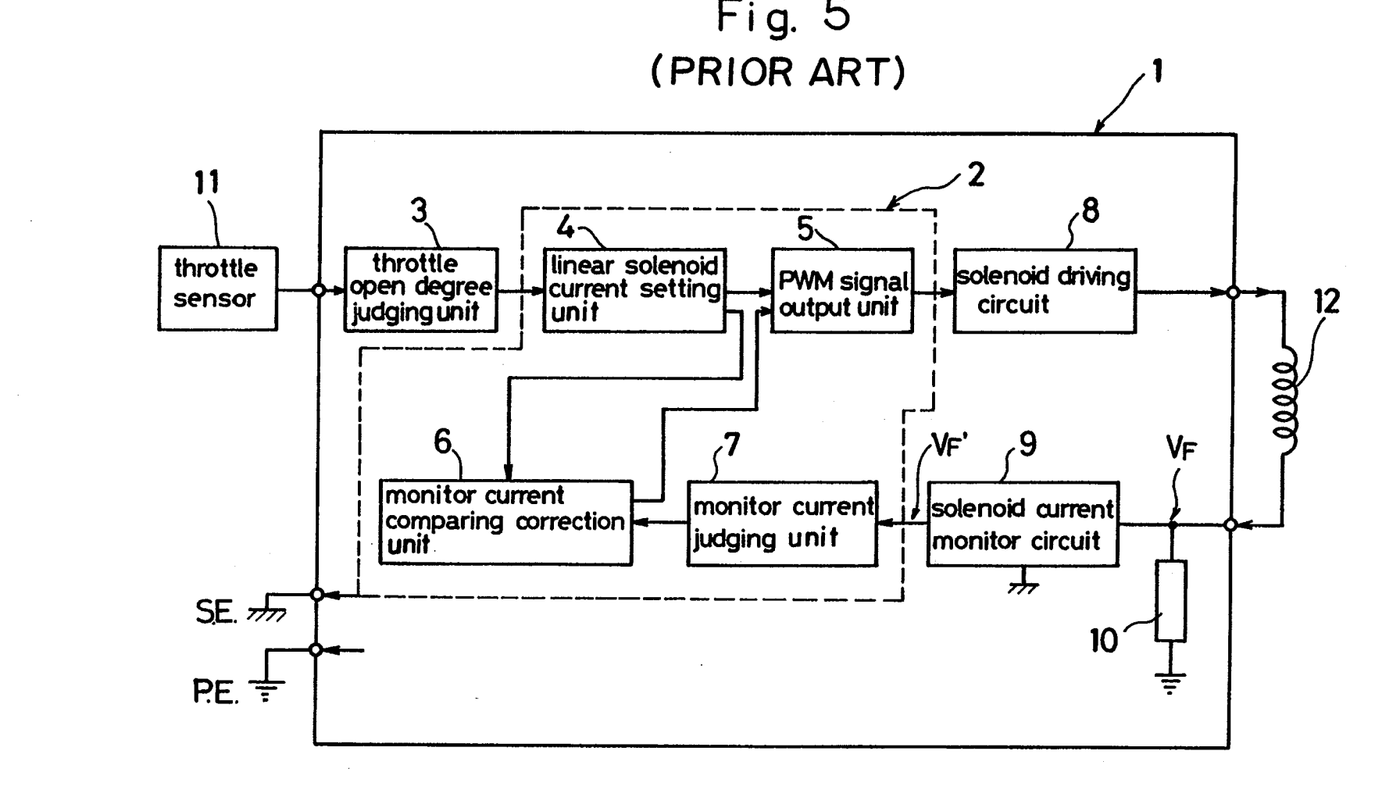
FIG. 5 is a block diagram of the current control system of the linear solenoid of a conventional electronic control type speed changers.
Figure 6:
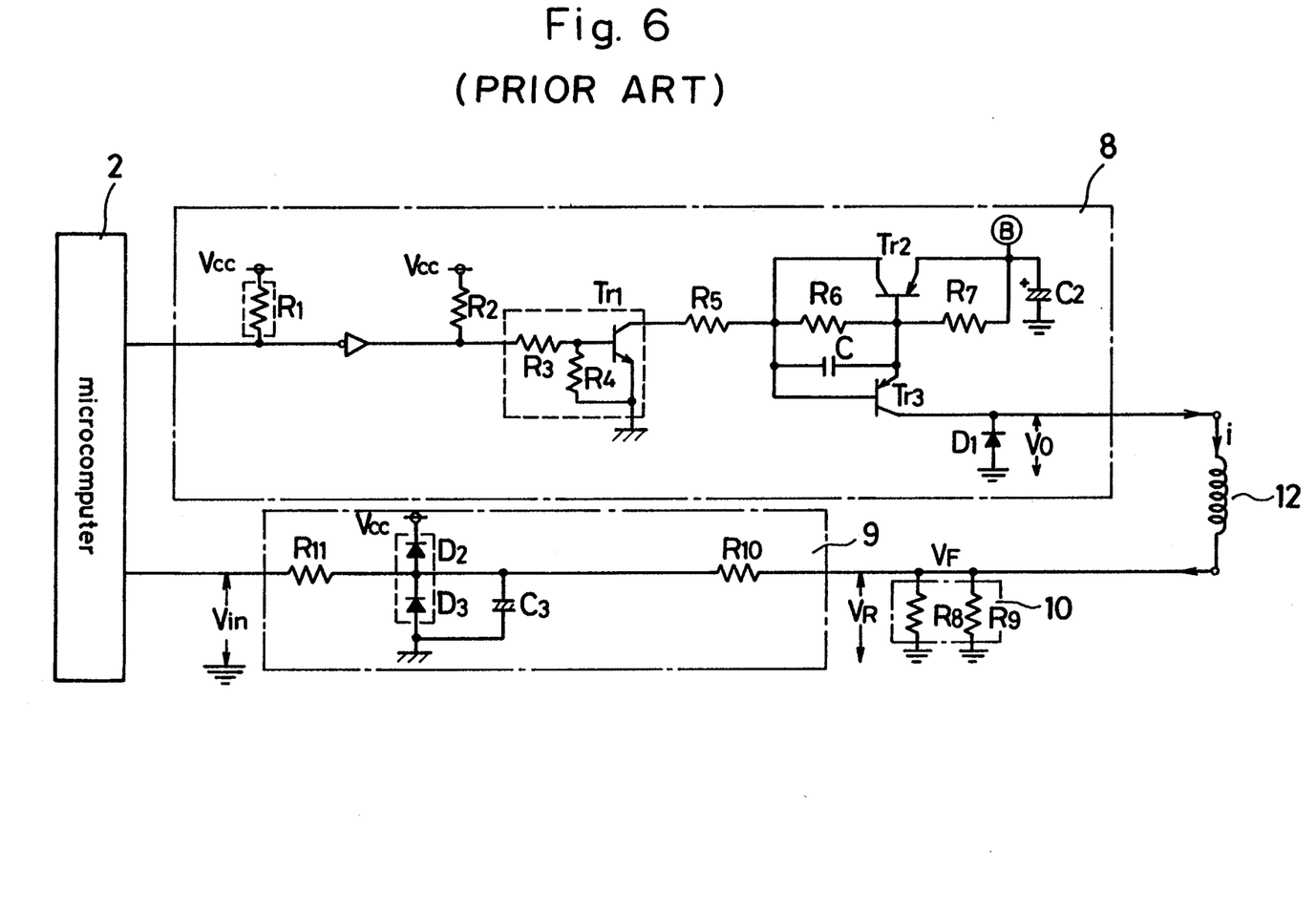
FIG. 6 is a partial circuit diagram of the current control system of FIG. 5.

As shown in FIGS. 5 and 6, since the electronic control device regulates the oil pressure of the automatic speed changer in accordance with the degree of throttle opening, responsive to signals from the throttle sensor 11, it controls the current of the linear solenoid 12. Also, as a noise countermeasure, it has the so-called PE for grounding the current passed through the linear solenoid and the so-called SE for grounding the current of the interface circuit of the microcomputer separately.

The electronic control device 1 is equipped with a microcomputer 2 comprising a linear solenoid current setting unit for receiving the signals from the throttle opening degree judging unit 3, a PWM (pulse width modulation) signal output unit 5, a monitor current comparing correction unit 6, and a monitor current judging unit 7. Further, it is equipped with a solenoid driving circuit 8 for driving the linear solenoid 12, a solenoid current monitor circuit 9, and a current monitor device (current monitor use resistor) 10.

However, when an electric potential difference is generated between PE and SE, the result is that the line pressure of the A/T does not coincide with the set value.

For example, in the case when PE is higher than SE by $\Delta V$ (V), the potential difference of the current monitor 10 for PE by the linear solenoid current is denoted as $V_F$, the ground of the solenoid current monitor circuit 9 becomes $V_{F'} = V_F + \Delta V$ due to SE, when it is seen from the solenoid current monitor circuit 9. This potential difference represents a current which is larger than the current actually flowing through the linear solenoid 12. Since the above-described feed back control acts in accordance with such erroneous signals as described above, the actual value of the current flowing in the linear solenoid 12 becomes lower than the set value.

In the case when SE is higher than PE for $\Delta V$ (V), the potential difference becomes $V_{F'} = V_F - \Delta V$ when seen from the solenoid current monitor circuit 9. This potential difference represents a current which is less than the current actually flowing in the linear solenoid 12. Therefore, since the above-described feed back control acts in accordance with such erroneous signals as described above, the actual value of the current flowing in the linear solenoid 12 becomes higher than the set value.

SUMMARY OF THE INVENTION

The present invention has the object of providing an electronic control circuit for an automatic speed changer, in which the above-described problems are eliminated, and accurate control of the linear solenoid can be carried out for the set value.

In order to attain the above-described object, in an electronic control circuit for an automatic speed changer equipped with a linear solenoid for controlling the oil pressure of the automatic speed changer, the present invention provides a current monitor device for monitoring the current passing through the above-described linear solenoid, a first solenoid voltage monitor circuit for monitoring the potential at the linear solenoid side of said current monitor device, a power ground—signal ground potential difference compensation device connected in series between the above-described current monitor device and the power ground, and a second solenoid current monitor circuit for monitoring the potential at the connection between the above-described current monitor device and the power ground-signal ground potential difference compensation device.

According to the present invention, as described above, in order to compensate for the potential difference between PE and SE which has been a conventional problem, there is provided a PE−SE potential difference compensation device in series between the current monitor device and PE. A solenoid monitor circuit is provided for monitoring the voltage of the connection point of the current monitor part to the PE−SE potential difference compensation device so that the voltage proportional to the current actually flowing in the linear solenoid can be detected, even if a potential difference is generated between PE and SE. In effect, the current value set for the solenoid current and the actual current passing through the solenoid can be made to accurately coincide, and accuracy of the control of the oil pressure of the automatic speed changer can be enhanced.

BRIEF DESCRIPTION OF THE DRAWINGS

In the following, an explanation will be provided in detail on the embodiments of the present invention by referring to the drawings.

DETAILED DESCRIPTION OF THE PREFERRED EMBODIMENTS

Figure 1A:
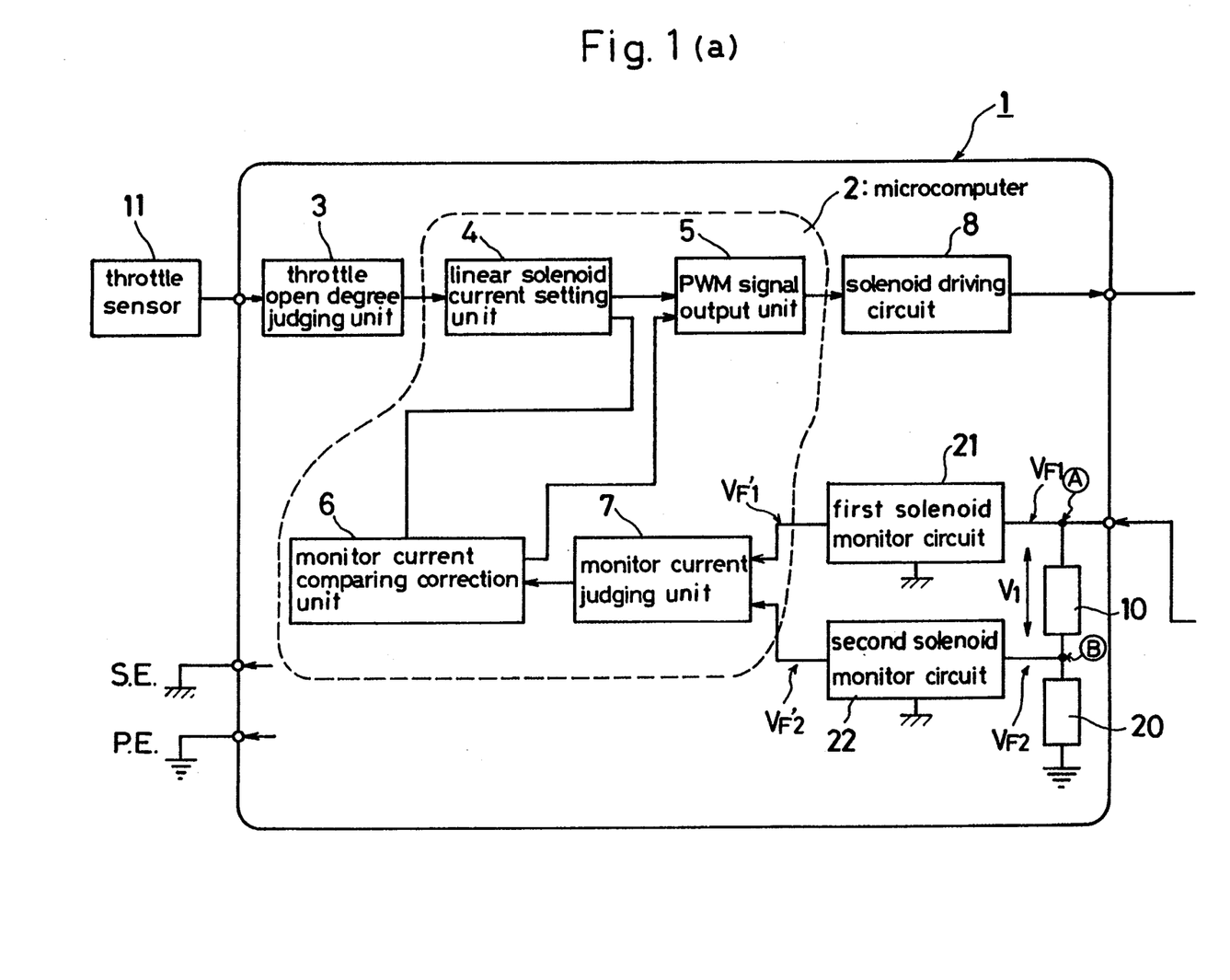
FIGS. 1(a), 1(b) provide an overall diagram of the system of the electronic control type automatic speed changer showing an embodiment of the present invention.
Figure 1B:
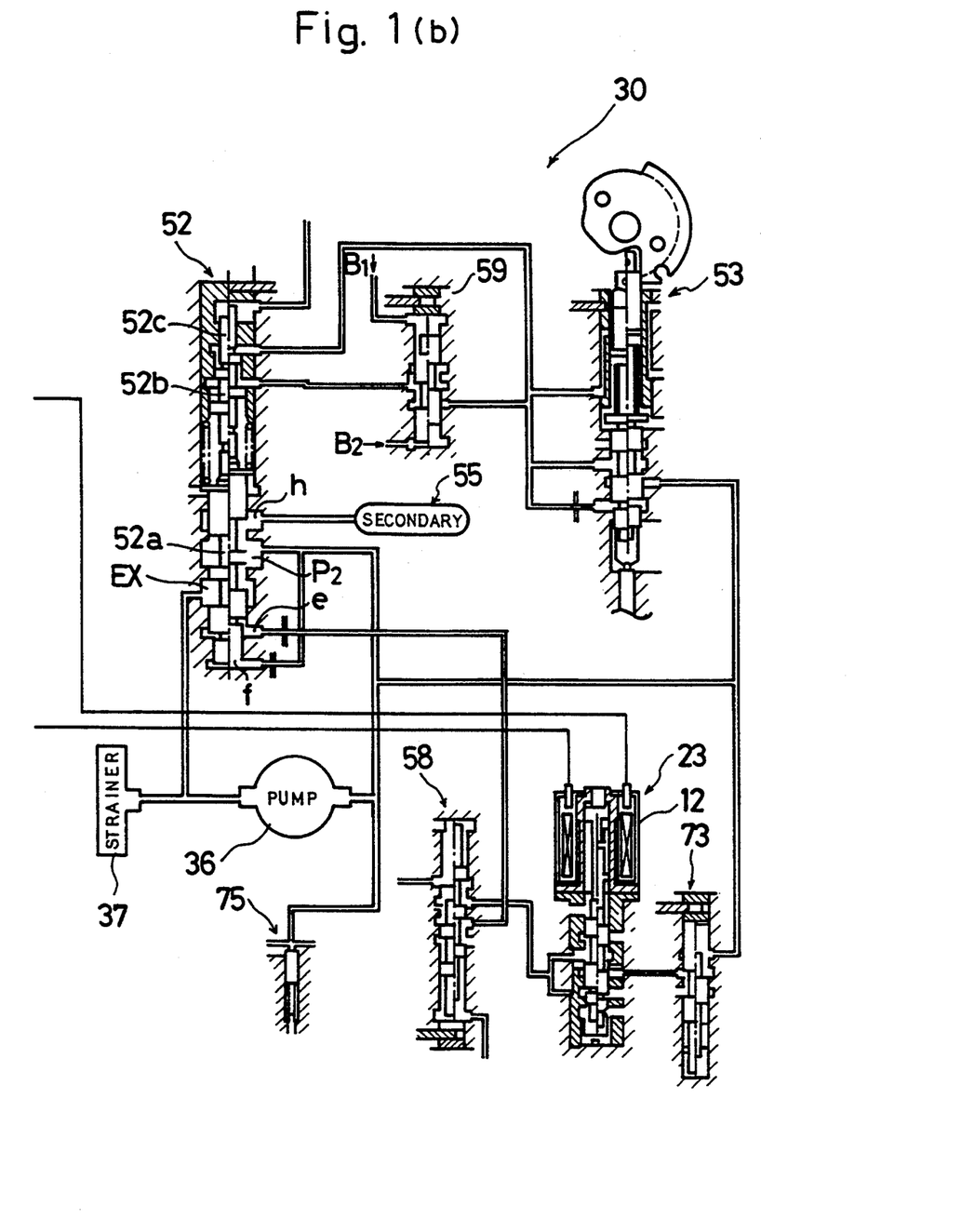

As shown in FIG. 1, in the electronic control device 1, signals from a throttle sensor 11 are received, and the degree to which the throttle is open is determined by a throttle open degree judging circuit 3. The results are sent to a linear solenoid current setting unit 4 which sets the linear solenoid current at a value providing a line pressure within the A/T corresponding to the degree of throttle opening. The current values set in the linear solenoid current setting unit 4 are respectively outputted to the PWM signal output unit 5 and the monitor current comparing correction unit 6. In the PWM signal output unit 5, the PWM signals of a certain constant frequency (for example, 300 Hz) for supplying a predetermined current are outputted to the solenoid driving circuit 8. In setting the PWM signals, correction is carried out based on the signals from the monitor current comparing correction unit 6 described below. The solenoid driving circuit 8 amplifies the current value for driving the linear solenoid 12 on the basis of the signals from the PWM signal output unit 5, and produces an output current.

Next, an explanation will be provided of the oil pressure circuit relevant to the linear solenoid 12. An oil pressure circuit 30 includes a linear solenoid valve 23 having a linear solenoid 12, a pump 36, and a strainer 37. The oil pressure circuit 30 also includes a primary regulator valve 52 having a main spool 52a, a subspool 52b, a plug 52c, a control chamber e, a feed back port f, a line pressure port P, a secondary regulator port h, and a drain port EX connected to the strainer 37. In addition, a throttle valve 53, a secondary regulator valve 55, a solenoid relay valve 58, a cut back valve 59, a solenoid regulator valve 73, and a pressure relief valve 75 are provided.

A control chamber e for adjusting the line pressure downward is provided in the primary regulator valve 52, and the control pressure from the linear solenoid valve 23 is supplied to the control chamber e through the solenoid relay valve 58. On the basis of the signals from the sensor (not shown in the figure) for detecting the selected position of the manual valve (not shown in the figure), the linear solenoid valve 23 is controlled, and at the time of shifting from the neutral range N to the drive range D or to the reverse range R, the control pressure is supplied from the linear solenoid valve 23 to the control chamber e. As an example thereof, in the case where the linear solenoid valve 23 controls the lock-up clutch, the control pressure from the linear solenoid valve 23 is supplied to the control chamber e via the solenoid relay valve 58.

The primary regulator valve 52 is arranged such that the energizing power based on the throttle pressure acts at one end of the main spool 52a, and at the other end thereof, the feed back pressure from the line pressure port $P_z$ acts. The control pressure from the linear solenoid valve 23 acts through chamber e on spool lands of different diameter (step difference). Further, the primary regulator valve 52 includes a line pressure port $P_z$, and a secondary regulator valve port h communicating with the drain port EX. The secondary regulator valve 55 is connected to port h.

Returning again to the electronic control device of FIG. 1(a) and 1(b), for example, even in the case of the same PWM signals for the linear solenoid 12, since the current value differs due to the fluctuation of the resistance value of the linear solenoid 12, the change of the resistance value due to temperature, or the fluctuation of the battery voltage as the driving electric source of the linear solenoid 12, the actual current value flowing in the linear solenoid 12 is monitored, and the correction of the PWM signals is carried out based on the monitored value thereof. For this purpose, a current monitor device (current monitor use resistor) 10 is provided in series with the linear solenoid 12, and a PE—SE potential difference compensation device (diode) 20 is also provided in series. A second solenoid monitor circuit 22 is provided in order to monitor the voltage of the connection point of the current monitor device 10 and the PE—SE potential difference compensation device part 20. Also, the first solenoid monitor circuit 21 and the second solenoid monitor circuit 22 are made as SE as a countermeasure against noise.

Therefore, the potential (potential at the point A), $V_{F1}$ of the electric source side of the current monitor device 10 is smoothed in the first solenoid monitor circuit 21, and is converted into a stabilized voltage waveform without pulsation. Also, the potential (potential) at the point B) $V_{FZ}$ of PE side of the current monitor device 10 is also smooth in the second solenoid monitor circuit 22, and is converted into a stabilized voltage waveform without pulsation. In the manner described above, the signals converted in the first solenoid monitor circuit 21 and the second solenoid monitor circuit 22 are respectively transmitted to the monitor current judging unit 7, and the monitored solenoid current is judged from the difference between these signals. Therefore, the monitor current judging unit 7 can monitor the voltage $V_1$ applied to the current monitor part 10 containing no voltage error due to PE. In effect, the voltage accurately proportioned to the current value flowing in the linear solenoid 12 can be monitored. This result is sent to the monitor current comparing correction unit 6 and is compared with the current value set by the linear solenoid current setting unit 4. Here, in the case when there is difference between the current values, a feed back control which provides correction signals is carried out.

Figure 2:
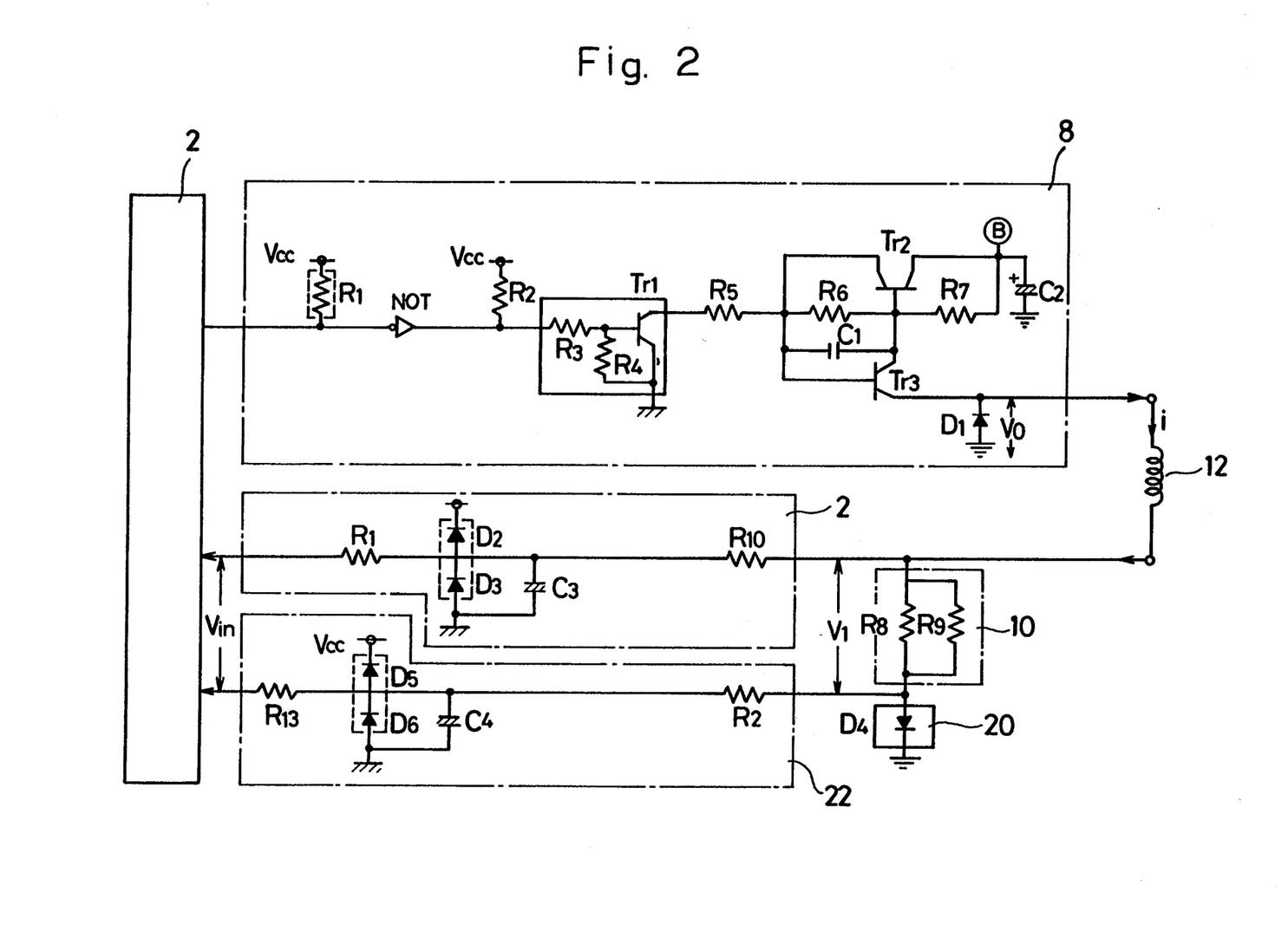
FIG. 2 is a detailed circuit diagram of the electronic control type automatic speed changer of the present invention.

In FIG. 2 is shown the detailed circuit diagram of the electronic control type automatic speed changer of the present invention. In this figure $R_1$ to $R_{13}$ denote resistors, and NOT is a negative logic NOT circuit. The components $T_{r1}$ to $T_{r2}$ are transistors, $C_1$ to $C_4$ are capacitors, and $D_1$ to $D_6$ are diodes. Particularly, for example, $R_8$ and $R_9$ are 1.8 106 , $D_4$ is D608 U05C, $R_{12}$ is 15 k Ω, $D_5$ and $D_6$ are D609 1SS123, $C_4$ is 2.2 μF, and $R_{13}$ is 5.1 k Ω.

Since the diode $D_1$ receives the surge reverse electromotive force from the linear solenoid 12, it has the function of preventing breakdown of the transistor $T_{r3}$ due to the influence of surge voltages. Also, since the linear solenoid 12 is at the outside of the electronic control device, noises are apt to enter from the outside of the electronic control device which can influence the microcomputer 2. In order to prevent this effect, two pairs of diodes D2 and D3', and D5 and D6 are provided on the SE side and $V_{cc}$ side.

Figure 3:
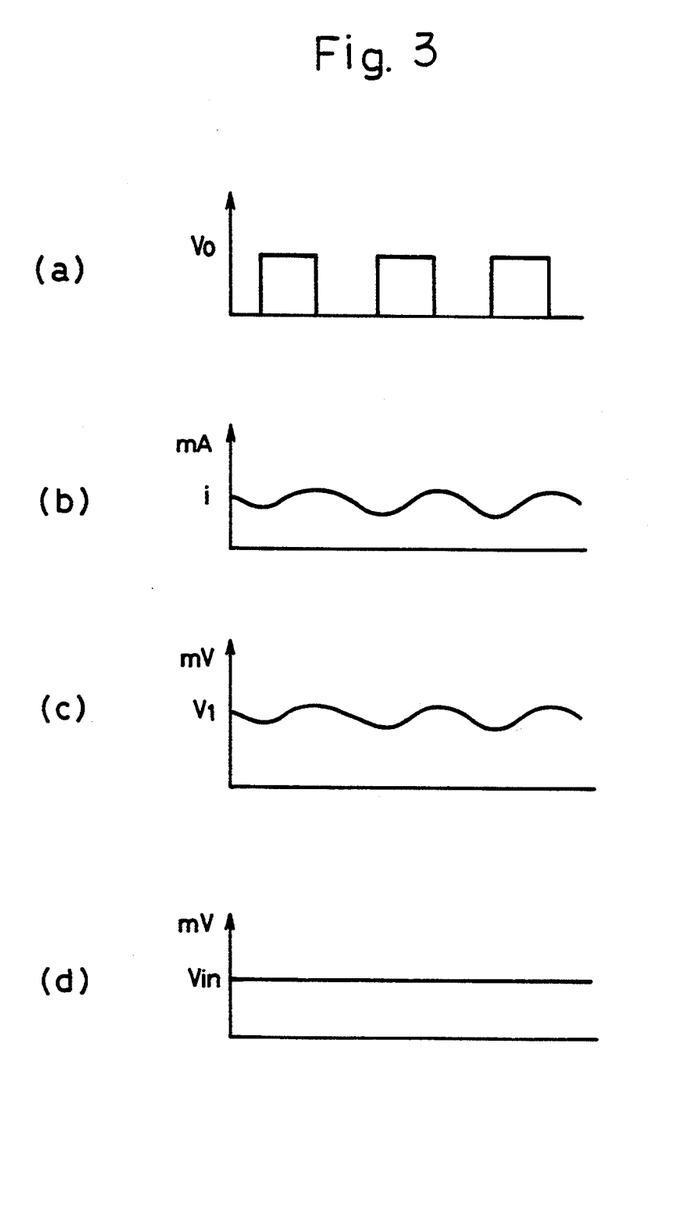
FIG. 3 is waveform diagram of the circuit part thereof.

The output voltage $V_o$ of the solenoid driving circuit 8 is a pulse-like voltage waveform as shown in FIG. 3(a), and the current i of the waveform as shown in FIG. 3(b) flows in the linear solenoid 12. The voltage of that waveform across terminals of the current monitor device 10, accurately corresponds to the current i of the linear solenoid 12. Voltage of the waveform as shown in FIG. 3(c) is the input voltage $V_{1n}$ to the microcomputer 2.

In the manner described above, in the present invention, in order to compensate for the potential difference of PE−SE, the PE−SE potential difference compensation device (diode) 20 is provided. Also, it is observed that, for the connection point of the current monitor device 10 and the PE−SE potential difference compensation device 20, a potential difference proportional to the current value flowing in the linear solenoid 12 is generated. The second solenoid monitor circuit 22 is provided in order to detect that potential difference. Thus, the signals of both the first solenoid monitor circuit 21 and the second solenoid monitor circuit 22 are sent to the monitor current judging circuit 7 to determine the monitored solenoid current on the basis of the difference between those signals, and the result is sent to the monitor current comparing correction circuit 6.

At this point, an explanation is provided by concrete examples. When PE is higher than SE by $\Delta V$ (V), the potential at the point A becomes $V_{F1} = V_1 + V_{FZ}$. Here, $V_1$ represents the potential difference between the point A and the point B. Also, in the case where a diode is used as the PE−SE potential difference compensation device 20, the voltage descending portion of the diode becomes about 0.7 V. The solenoid monitor circuits 21 and 22 are grounded in such a manner that the output potential is $V_{F1'} = V_{F1} + \Delta V$ due to SE, for the first solenoid monitor circuit 21. On the other hand, for the second solenoid monitor circuit 22, the output potential becomes $V_{FZ'} = V_{FZ} + \Delta V$.

As a result, on the basis of $V_{F1'}$ and $V_{FZ'}$, the monitor current judging circuit provides an output:

$$V_F = V_{F1'} - F_{FZ'}$$
$$= (V_{F1} + \Delta V) - (V_{FZ} + \Delta V)$$
$$= V_{F1} - V_{FZ}$$
$$= V_{1'}$$

and a potential independent of $\Delta V$ can be obtained. In effect, an accurate voltage proportional to the current actually flowing in the linear solenoid 12 can be detected.

Similarly, when SE is higher than PE by $\Delta V$ (V), the potential at the point A is $V_{F1} = V_2 + V_{FZ}$, and for the first solenoid monitor circuit 21, its output potential becomes $V_{F1'} = V_{F1} - \Delta V$. For the second solenoid monitor circuit 22, it becomes $V_{FZ'} = V_{FZ} - \Delta V$ In such a manner as described above, similarly as on the basis of $V_{F1'}$ and $F_{FZ'}$, the monitor current judging part 7, provides an output:

$$V_F = V_{F1'} - F_{FZ'}$$
$$= (V_{F2} + \Delta V) - (V_{FZ} + \Delta V)$$
$$= V_{F1} = V_{FZ}$$
$$= V_{1'}$$

and similarly as in the above-described case, a potential independent of $\Delta V$ can be obtained. In effect, an accurate voltage difference proportional to the current actually flowing in the linear solenoid 12 can be detected.

In other words, the PE−SE potential difference compensation device 20 has the function of providing a standard potential in order to avoid the situation in which an accurate current correction to the linear solenoid 12 cannot be carried out because the voltage cannot be read by the microcomputer in the case when the voltage of PE has become lower than the potential of SE.

Although in the above-described embodiments, a diode is used as the PE−SE potential difference compensation device, it possible, in correspondence to needs, that a plurality of diodes may be used in series or a resistor, FET (electric field effect transistor), or a conventional transistor or the like can be used.

Figure 4:
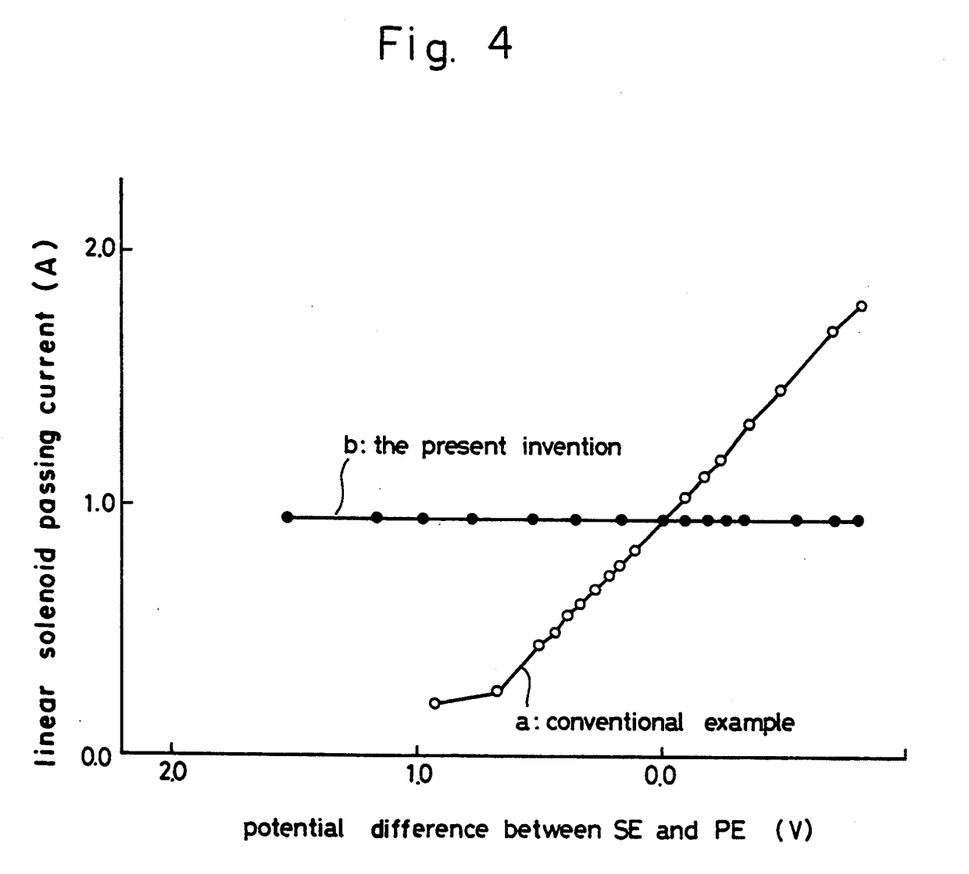
FIG. 4 is a graph comparing the present invention with a conventional system.

With the above-described arrangement, in the case when the potential difference between SE−PE is 0 V, as shown in FIG. 4, even in the conventional system a and in the system b of the present invention also, the linear solenoid current i coincides with the current set value 0.94 A. However, in the case of the conventional system a, when the potential difference between SE−PE becomes negative, the linear solenoid current i becomes lower than 0.94 A, and on the contrary when the potential difference between SE−PE becomes positive, the current set value becomes higher than 0.94 A, and an error occurs in the current set value. In contrast to this, in the case of the system of the present invention, it is clear that the solenoid current i coincides with the current set value.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electronic control circuit for a linear solenoid which controls oil pressure in an automatic speed changer, said control circuit comprising:
   a current monitor device having a first side connecting with the linear solenoid and a second connection;
   a first solenoid monitor circuit for monitoring the potential at said first, linear solenoid side of said current monitor device relative to a signal ground;
   potential difference compensation means connected in series between said second connection of said current monitor device and a power ground, for providing a compensation voltage drop between the second connection and the power ground; and
   a second solenoid monitor circuit for monitoring the potential at said second connection relative to the signal ground;

solenoid current determining means, connected to said first and second solenoid monitor circuits for determining actual current through the solenoid, wherein voltage differences between the signal and power grounds are eliminated.

2. The electronic control circuit of claim 1, wherein said potential difference compensation means is a diode.

3. The electronic control circuit of claim 1 further comprising throttle open degree judging means for detecting degree of opening of a throttle;

linear solenoid current setting means for setting a current to the linear solenoid responsive to the detected degree of throttle opening;

current comparing means for comparing the actual current with the set current and for generating a correction signal as a function of the difference between the set current and the actual current, said linear solenoid current setting means correcting the set current responsive to said correction signal.

4. An electronic control type automatic speed changer equipped with a linear solenoid for controlling the oil pressure of the automatic speed change, a throttle sensing circuit for determining the degree to which the throttle is open, a linear solenoid current setting unit responsive to the throttle sensing circuit for setting a solenoid current value corresponding to the throttle open degree, a pulse width modulation signal output unit connected to said linear solenoid current setting unit, a monitor current comparing correction unit connected between said linear solenoid current setting unit and said pulse width modulation signal output unit, a solenoid driving circuit connected to said pulse width modulation signal output unit for driving said linear solenoid, a monitor current judging unit connected to said monitor current comparing correction unit, a current monitor device for monitoring the current through said linear solenoid, a first solenoid monitor circuit for detecting the potential of the linear solenoid side of said current monitor device relative to a signal ground, potential difference compensation means, connected in series between said current monitor device and a power ground, for providing a compensation voltage drop between the connection point of said current monitor device with the potential difference compensation means and the power ground and a second solenoid monitor circuit for detecting the potential at said connection point, said monitor current judging unit determining actual current through said linear solenoid as a function of the difference between the potentials detected by said first and second solenoid monitor circuits.

5. The electronic control type automatic speed changer of claim 4, wherein said potential difference compensation means comprises one or more diodes connected in series with said current monitor device.

6. The electronic control type automatic speed changer of claim 4, wherein said first and second solenoid monitor circuits are each connected to said monitor current judging unit.

7. The electronic control type automatic speed changer of claim 4 wherein said monitor current comparing correction unit compares the actual current with the set solenoid current and generates a correction signal as a function of the difference between the set solenoid current and the actual current, said linear solenoid current setting unit correcting the set solenoid current value responsive to said correction signal.

8. An electronic control circuit for a hydraulic controller for controlling hydraulic control pressure in an automatic transmission for a vehicle, said control circuit comprising:

a solenoid disposed in the hydraulic controller of the automatic transmission;

a solenoid driving circuit for driving said solenoid with an actuating current;

a linear solenoid current setting unit for setting a value for said actuating current;

a resistance element electrically connected in series with said linear solenoid;

a diode electrically connected between the resistance element and a power ground;

a first solenoid monitor circuit for detecting voltage at a connecting point connecting the linear solenoid and the resistance element, said first solenoid monitor circuit being connected to a signal ground;

a second solenoid monitor circuit for detecting voltage at a connecting point connecting the resistance element and said diode, said second solenoid circuit being connected to the signal ground;

a monitor current judging unit for receiving the detected voltages of the first and second solenoid monitor circuits and for calculating a monitoring current as a function of a voltage difference between opposite ends of the resistance element;

a monitor current comparing correction unit for effecting feedback control of the actuating current by comparing the calculated monitoring current with the set value and generating an error signal on the basis of said comparing, said actuating current being corrected to said set value responsive to said error signal.

9. The solenoid driving circuit according to claim 8 wherein said first and second solenoid monitor circuits are each connected to said monitor current judging unit.

10. The solenoid driving circuit according to claim 8 further comprising:

a pulse width modulation signal output unit for receiving a basic pulse width signal from said linear solenoid current setting unit and said error signal and for outputting a pulse width modulation signal at a constant, predetermined frequency to said solenoid driving circuit.

11. The solenoid driving circuit according to claim 8 further comprising:

a throttle sensing circuit for detecting degree of opening of a throttle; and wherein said linear solenoid current setting unit sets said actuating current at a value corresponding to the detected degree of throttle opening.

* * * * *

UNITED STATES PATENT AND TRADEMARK OFFICE
CERTIFICATE OF CORRECTION

PATENT NO. : 5,335,565
DATED : August 9, 1994
INVENTOR(S) : ITO et al

It is certified that error appears in the above-indentified patent and that said Letters Patent is hereby corrected as shown below:

Col. 4, line 36, delete "smooth" insert --smoothed--;

line 59, delete "$T_{r2}$" and insert --$T_{r3}$--; and line 61, "1.8 106" should read --1.8 $\Omega$--.

Col. 6, line 23, after "it" insert --is--.

Signed and Sealed this

First Day of August, 1995

BRUCE LEHMAN

Attest:

Attesting Officer    Commissioner of Patents and Trademarks